(12) United States Patent
Di Pede

(10) Patent No.: US 6,925,766 B2
(45) Date of Patent: Aug. 9, 2005

(54) MULTILAYER SLIP RESISTANT SHEET MATERIAL

(75) Inventor: Sandro Di Pede, Toronto (CA)

(73) Assignee: IBCO Srl (BB)

( * ) Notice: Subject to any disclaimer, the term of this patent is extended or adjusted under 35 U.S.C. 154(b) by 31 days.

(21) Appl. No.: 10/390,757

(22) Filed: Mar. 19, 2003

(65) Prior Publication Data

US 2004/0148887 A1 Aug. 5, 2004

(30) Foreign Application Priority Data

Feb. 5, 2003 (CA) .............................................. 2418498

(51) Int. Cl.$^7$ .............................................. E04D 1/10
(52) U.S. Cl. .............................. 52/408; 52/177; 52/181
(58) Field of Search .......................................... 52/408

(56) References Cited

U.S. PATENT DOCUMENTS

| | | | | |
|---|---|---|---|---|
| 4,054,710 A | * | 10/1977 | Botsolas | 442/31 |
| 4,054,711 A | * | 10/1977 | Botsolas | 442/31 |
| 4,319,854 A | * | 3/1982 | Marzocchi | 404/28 |
| 4,866,897 A | * | 9/1989 | Yount | 52/363 |
| 4,992,315 A | | 2/1991 | Zickell et al. | |
| 5,613,332 A | * | 3/1997 | Saylor, Jr. | 52/177 |
| 5,687,517 A | | 11/1997 | Wiercinski et al. | |
| 5,693,395 A | * | 12/1997 | Wine | 428/49 |
| 5,787,655 A | * | 8/1998 | Saylor, Jr. | 52/181 |
| 5,948,505 A | * | 9/1999 | Puppin | 428/121 |
| 6,021,611 A | * | 2/2000 | Wells et al. | 52/98 |
| 6,044,598 A | * | 4/2000 | Elsasser et al. | 52/181 |
| 6,112,492 A | * | 9/2000 | Wells et al. | 52/558 |
| 6,192,650 B1 | * | 2/2001 | Kittson et al. | 52/741.4 |
| 6,296,912 B1 | | 10/2001 | Zickell | |
| 6,308,482 B1 | | 10/2001 | Strait | |
| 6,352,754 B1 | * | 3/2002 | Frost et al. | 428/77 |
| 6,355,333 B1 | * | 3/2002 | Waggoner et al. | 428/174 |
| 6,378,259 B1 | | 4/2002 | Carlson | |
| 6,427,395 B1 | * | 8/2002 | Elsasser et al. | 52/181 |
| 6,715,249 B2 | * | 4/2004 | Rusek et al. | 52/481.1 |
| 6,745,535 B2 | * | 6/2004 | Nordgren et al. | 52/506.01 |

FOREIGN PATENT DOCUMENTS

| | | |
|---|---|---|
| WO | WO-99/40271 A1 | 8/1999 |
| WO | WO-01/73242 A1 | 10/2001 |
| WO | 2326257 A1 | 5/2002 |

* cited by examiner

Primary Examiner—Rodney B. White
(74) Attorney, Agent, or Firm—Stephen R. Burri; Miller Thomson LLP

(57) ABSTRACT

There is provided a sheet material having a walking surface with high slip resistance. The sheet material has a flexible structural layer laminated to a mesh layer which has interconnected reinforced strands and protruding nodes to impart a high coefficient of friction. The high coefficient of friction of the sheet material provides a roofing underlayment which is safe to walk upon in dry, wet or dusty conditions, and on steeply sloped surfaces. The sheet material may also be used as an industrial wrapping material or a fabric.

46 Claims, 3 Drawing Sheets

MULTILAYER SLIP RESISTANT SHEET MATERIAL

TECHNICAL FIELD OF THE INVENTION

The invention relates to sheet materials. In particular, the invention relates to sheet materials for use as roofing underlayments, industrial wrapping materials or fabrics.

BACKGROUND OF THE INVENTION

In both residential and commercial roofing applications, a primary roof covering material provides the main water protection barrier. Whether the primary covering is composition shingles, metal panels or shingles, concrete or clay tiles, wood shakes, or slate, it is the function of the primary roofing material to protect the building interior from water ingress.

In some circumstances, whether due to primary roofing material design, installation practices, or accidental breach of the primary roofing material, water can penetrate the primary roofing material. To protect the building interior in these circumstances, it is common to use a secondary water shedding device called a roofing underlayment which acts as a temporary water shedding device.

A variety of roofing underlayment products are commonly used. The two major classes are mechanically attached and self-adhered underlayments, the latter commonly referred to as "peel and stick".

It is desirable that a roofing underlayment provide a surface which has a sufficiently high coefficient of friction ("COF") to be safe for an applicator to walk upon. The phrase "high coefficient of friction" in this document means a static coefficient of friction of at least 0.8 or a dynamic coefficient of friction of at least 0.8. Underlayments should be easily affixable to a roofing surface, for example by nailing or adhesion. They should ideally be impermeable to moisture. High tensile and tear strengths are also desirable to reduce tearing during application and exposure to high winds. Underlayments should be light in weight to facilitate ease of transport and application, and should be able to withstand prolonged exposure to sunlight, air and water.

A common mechanically attached roofing underlayment product used in the United States and Europe is bituminous asphalt-based felt, commonly referred to as felt. Typically, this felt comprises organic paper felt saturated with asphaltic resins to produce a continuous sheeting material which is processed into short rolls for application.

Such felts generally demonstrate good resistance to water ingress and good walkability in dry and wet roof conditions. Disadvantages include very low tensile and tear strengths, relatively high weight per unit surface area, a propensity to dry and crack over time, extreme lack of resistance to ultraviolet ("UV") exposure, high likelihood of wind blow off, and a propensity to absorb water causing buckling and wrinkling, thus preventing the application of direct primary roofing materials such as composition shingles.

As felts have very low tensile and tear strengths, their use is generally confined to roofing applications where the roofing underlayment is attached directly to a solid, continuous roofing deck, rather than in spaced sheathing applications where open spaces characterize the roof structure. Use of felts in spaced sheathing roofs would endanger the applicator should the applicator walk over a section of the roof structure covered only by felt.

In climatic regions where ice damming or prolonged exposure to water is prevalent, it is common to employ thick rubberized asphalt-based underlayments in the valleys, eaves, and seams of the roof. These underlayments are generally applied not by mechanical means, but by adhesives exposed by removing release liners from the bottom surface of the underlayment.

In Europe, it is common in roofing design to utilize spaced sheathing rather than solid decking prior to application of the primary roof covering materials. To address the safety issue of an applicator falling through rafters, several products have been marketed with high tensile and tear strengths which are specifically designed to prevent applicator breach during application.

These materials are generally reinforced membranes such as woven hybrids with other laminates or coatings, or reinforced non-woven polymeric synthetic materials, rather than asphaltic felts. They are generally lightweight, thin, have high tensile, tear and burst strengths, and are superior to felts in UV resistance and resistance to drying and cracking over time.

The major drawback of such underlayments is their low COF on the walking surface in dry or wet conditions. This problem limits the commercial attractiveness of such products in high pitch roofs or in climates characterized by frequent and sporadic wet or humid conditions. It has limited these products to spaced sheathing applications where safety and tensile strength are more important than walkability.

In many markets, such as the US and Canada, building design is characterized by roofing structures possessing solid decking substrates onto which is applied roofing underlayment and, ultimately, the primary roofing material. As the decking surface provides a safe walking medium for the roof applicator, underlayment walkability, that is, the ability to permit applicators to walk upon the underlayment without slipping, becomes more important than tensile strength. Any roofing underlayment which does not provide walking safety under dry and wet conditions will be unsafe for use without special precautions, and will be severely limited in commercial market penetration.

Such underlayments include RoofGuard™ and RoofTOPGuard II™ produced by Rosenlew of Finland. These are produced using woven tape technology as a reinforcement, and are two-sided polymer-coated for encapsulating the porous woven substructure. RoofGuard™ utilizes smooth, high COF polymers to improve walkability in dry conditions. However, it suffers dramatic reduction in COF in wet conditions.

In RoofTOPGuard II™, the walking surface has been replaced by a polypropylene spun bond non-woven layer. This surface provides a slight improvement in walkability in some wet surface conditions. However, it does not provide safety in highly pitched roofs and very wet conditions. The non-woven material also has a tendency to peal or suffer surface fiber tears under foot load, and does not readily absorb or displace water when walked upon. Therefore, this product is limited in its ability to compete with felt roofing underlayments under wet conditions.

TRIFLEX 30™, produced by Flexia Corporation of Canada is of spun bond polypropylene construction, with a polypropylene layer coating both sides. The surface is relatively smooth and void of any surface texture properties which would provide high COF properties under wet or dusty conditions.

There are other examples of underlayment products, notably in the self-adhered or "peel and stick" bituminous membrane market, which possess various surface designs aimed at improving walkability under wet conditions. Grace Construction Products produces various rubberized asphalt self-adhered products, including Select™ and Ultra™, having either a grainy polymer film laminate surface or an embossed polymer adhesive pattern as a surface layer. Neither product, however, works well under wet or dusty conditions.

Polyglass produces Polystick P™ and Polystick MU™ self-adhered underlayment with polymer corrugated film laminated and non-woven fabric surfaces. Neither of these products works very well in wet conditions, as there is no mechanism to generate high normal and shear forces under walking load to resist slippage.

Additional mechanical and self-adhering membrane roofing underlayment products are shown in Table 1, in which "M" refers to mechanically applied underlayments and "SA" to self-adhered underlayments. All of the abovementioned materials, as well as all materials in Table 1, were tested in simulated test roof pitches ranging from a 4:12 pitch (a vertical rise of 4 units over a horizontal distance of 12 units) to a 12:12 pitch under extremely wet surface conditions. All materials were found to possess surfaces that become highly slippery and unsafe to walk upon when coated with water.

TABLE 1

Roofing underlayment products

| Supplier | Type | Trade Name | Surface Layer Type |
|---|---|---|---|
| MFM Building Products | SA | Ice Buster ™ | silver, embossed polymer film |
| MFM Building Products | SA | Wind & Water Seal ™ | black, grainy polymer film |
| TAMKO | SA | TW Tile and Metal ™ | blistered surfaced film |
| Miradri | SA | WIP 200 ™ | black, embossed polymer film |
| Lafarge | M | Divoroll Top ™ | black, non woven fibers |
| Dupont | M | Tyvek Solid ™ | white, tan, pitted spun bonded |
| Daltex | M | RoofShield ™ | grey, embossed non woven fibers |

Wiercinski, in U.S. Pat. No. 5,687,517, describes a roofing underlayment with corrugated ridges in the machine direction to achieve slip resistance in installation on a sloped roof. The surface layer comprises oriented, corrugated film laminated onto substrate. These ridges comprise polymer materials having a low COF under dry or wet conditions. These ridges do not provide sufficient shear and normal force resistance under loading, as the individual ridges lack rigidity and bend over. Such an underlayment does not function well under wet conditions.

Strait, in U.S. Pat. No. 6,308,482, describes a reinforced roofing underlayment with a tensile strength sufficient to resist tearing when exposed to tensile loads from various directions. He further discloses provision of a slip-resistant polypropylene sheet on the outer surface of the roofing underlayment.

Neither of the above patents discloses satisfactory slip resistance under wet, humid or dusty conditions at high roof pitches between 4:12 and 12:12. Neither discloses an invention in which the bottom layer is resistant to slippage between the underlayment and the deck during installation, nor do they combine high tensile strength and slip resistance on both sides of the underlayment.

One method in the prior art of achieving a high COF under wet conditions is by embedding extremely hard, granular, inorganic particles into the surface of asphalt bituminous underlayments.

Polymer underlayments are produced by various forms of polymeric extrusion, lamination, or thermal calendaring. In extrusion coating methods, it is normal to use specially surfaced chilling rolls to quench the molten polymer to solidify the product and reduce thermal damage of the reinforcement. The use of hard inorganic particles would severely damage processing equipment, and also significantly increase the mass per unit area of the resulting underlayment, limiting the advantages inherent in lightweight synthetic polymer underlayments.

Adding hard particles to the throat of an extruder to produce granular coatings would not be feasible as it would damage the processing equipment. Particles would be unable to pass through normal filtration media or narrow die slits. Furthermore, adhesion between inorganic particles and thin thermoplastic coatings is generally very poor, permitting the particles to dislodge from the underlayment surface.

The use of specialty inorganic particle coatings could improve bonding to the underlayment surface, but would add technical complexity and cost. Also, hard inorganic particles may tear and gouge the relatively soft surface layers of the polymer underlayment if freed from the surface and walked upon, thereby permitting water penetration of the underlayment.

SUMMARY OF THE INVENTION

In general terms, the present invention is a polymeric multi-layer sheet material that provides a high COF in dry, wet or dusty surface conditions. The sheet material may be used for a variety of applications, including as a roofing underlayment, as an industrial wrapping material, and as a fabric. The high COF is achieved through the use of a noded mesh material, laminated to the walking surface of a structural layer or rubberized asphalt, such that the mesh provides a secure surface for walking even under dusty or wet conditions. In this document, the term "laminated" means fixedly connected surface to surface in a layered relationship.

The sheet material of the present invention is characterized by a structural layer having high tensile and tear strengths, coated with thermoplastic resins. A mesh possessing nodular characteristics and preferably coated on both sides with a tacky coating to provide an enhanced lamination to the structural layer and a high COF in dry, wet or dusty conditions, is laminated to the upper surface, and becomes the walking surface in underlayment applications. The mesh may be manufactured of plastic, metal, glass, or other materials.

In one of its aspects, the invention is a sheet material having a flexible structural layer and a mesh layer laminated to the structural layer, the mesh layer having interconnecting strands and protruding nodes at the junctions of the strands.

The sheet material may have a lamination layer laminated between the structural layer and the mesh layer. The lamination layer may be made of a polyolefin or a blend of polyolefins. The polyolefin may be a low-density polyethylene or polypropylene. It may be a polymer having a high COF.

The mesh layer may be treated with a tacky or high COF coating, which may be ethylene vinyl acetate copolymer.

The structural layer may be made of woven polyolefin tapes or non-woven polyolefin, or woven or non-woven reinforced membrane substrates such as polyethylene terephthalate, nylon or glass.

One or more layers of the sheet material or underlayment may be lightly coloured to reflect solar radiation, thereby reducing heat absorption of radiant energy transfer into the roof attic space. In this document, the term "lightly coloured" means being of a colour which possesses a total solar reflection (ASTM E903-96) of at least 25%. One or more layers of the sheet material or underlayment may be treated to increase UV resistance, thereby allowing extended exposure to the elements without damaging the underlayment. One or more layers may be treated with mold inhibitors to inhibit mold growth on the underlayment and immediate surrounding roof area. One or more layers may be treated with a fire retardant compound to increase fire resistance.

The sheet material may be used as an underlayment, an industrial wrapping material, or a fabric.

The sheet material may have a high COF coating on the lower surface of the structural layer.

In another of its aspects, the invention is a roof underlayment having a mesh layer with interconnected strands and protruding nodes at the junctions of the strands, the mesh layer laminated to a flexible structural layer, and a high COF film laminated to the lower surface of the structural layer. A first lamination layer may be laminated between the mesh layer and the structural layer and a second lamination layer may be laminated between the structural layer and the high COF film.

In yet another aspect of the invention, there is provided a roof underlayment having a mesh layer with interconnected strands and protruding nodes at the junctions of the strands, a bituminous rubberized asphalt layer laminated to the mesh layer, an adhesive layer laminated to the lower surface of the asphalt layer and a release liner releasably laminated to the lower surface of the adhesive layer to produce a self-adhering bituminous membrane roofing underlayment possessing a mesh layer surface that is highly walkable in wet conditions.

The sheet material and roof underlayment of the invention have a high COF, good walkability on sloped surfaces and exceptional slip resistance in dry, wet, or dusty conditions.

In a further aspect of the invention, there is provided a roofing underlayment having a top surface noded mesh layer with a high COF in dry, wet or dusty conditions. The underlayment has a structural layer with high tensile and tear strengths and a bottom surface with a sufficient COF to avoid slippage between the underlayment and the deck to which the underlayment may be applied.

Other aspects of the invention will be appreciated by reference to the description of the preferred embodiment which follows, and to the claims.

BRIEF DESCRIPTION OF THE DRAWINGS

Embodiments of the invention will now be described with reference to the accompanying figures, in which numerical references denote like parts, and in which.

DETAILED DESCRIPTION OF THE PREFERRED EMBODIMENT

Figure 1:
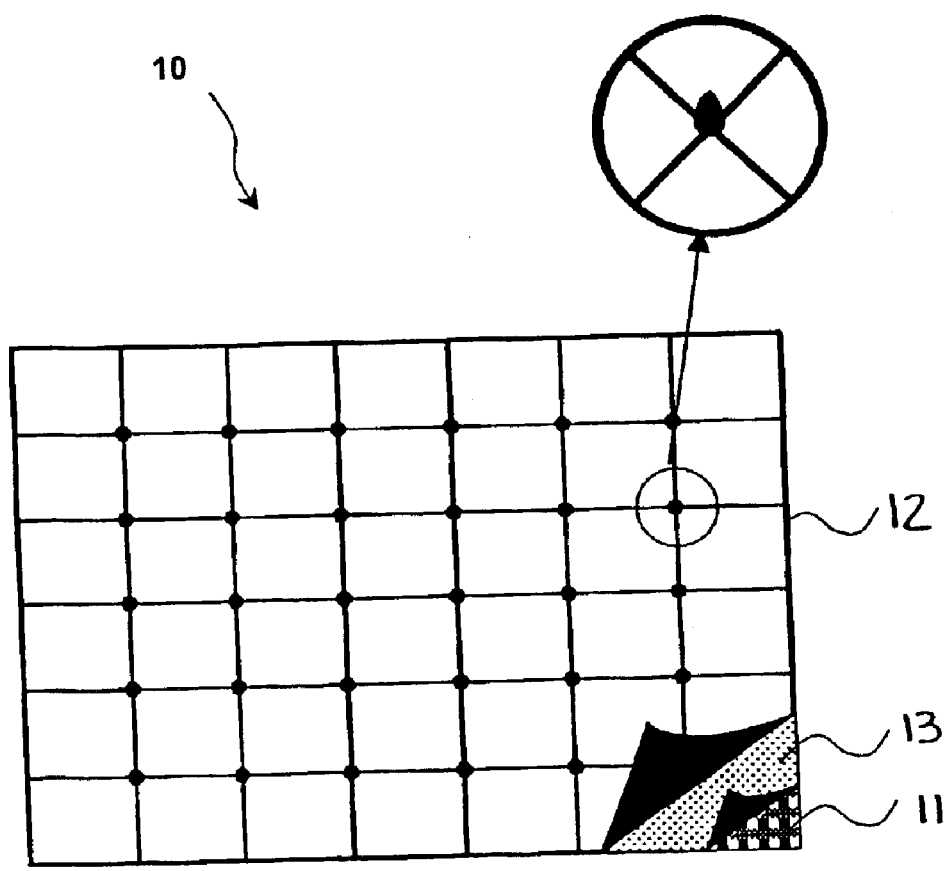
FIG. 1 is top view of the mesh layer of the invention showing the interlaced strands and nodes of the mesh.

Referring to FIG. 1, the multilayer slip-resistant sheet material of the present invention, generally indicated by reference numeral 10, has a noded mesh layer 12 having interconnected strands and protruding nodes at the junctions of the strands. Preferably, the nodes are significantly thicker than the strands, thus providing the key nodular characteristics. The mesh layer may be laminated by a synthetic resin lamination layer 13 to a structural layer 11. Alternatively, the mesh layer may be laminated directly to the structural layer, for example by existing means of thermal bonding using heat and pressure. The structural layer is preferably a woven or non-woven scrim of synthetic polymer resin, but other materials are possible.

Figure 2:
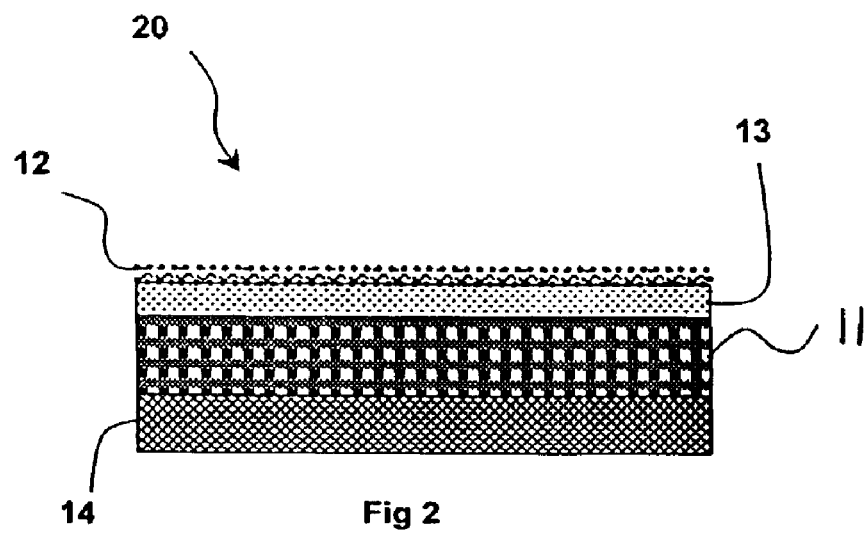
FIG. 2 is a cross-sectional view of one embodiment of a roofing underlayment according to the invention.

The sheet material may be used in a roofing underlayment. Referring now to FIG. 2, a roofing underlayment 20 has a structural layer 11, preferably a woven scrim made of synthetic polymer resin tapes, to provide tensile strength. The polyolefin tapes forming the scrim are fabricated by methods well known in the art. Typically, the scrim of the structural layer would have 8–64 tapes per decimeter (4–16 tapes per inch) in the machine direction and 8–64 tapes per decimeter (2–16 tapes per inch) in the cross direction. The machine direction is the linear direction in which the sheet material is manufactured. Other scrim construction parameters are also possible without departing from the scope of the invention.

A mesh layer 12 is laminated to the upper surface of the structural layer by a synthetic lamination layer 13. The mesh layer 12 has nodes protruding from its upper surface, and may be treated with a tacky coating such as ethyl vinyl acetate copolymer ("EVA") which provides an improved COF to the surface.

The lamination layer 13 may comprise a tacky polymer or a blend of tacky polymers. Such tacky polymers should have a high COF and may comprise low-density polyethylene, polypropylene or another copolymer polyolefin. The underlayment 20 also may be coated on its lower surface with a tacky non-slip polymeric resin coating 14. Both the lamination layer 13 and the coating 14 provide a membrane to prevent moisture passing through the sheet material. One or more of the layers may be treated with additives to increase UV resistance, retard fire, reduce heat absorption or reduce mold creation.

Alternatively, the mesh layer may be laminated to the structural layer by other means, including thermal calendaring or application of infrared or microwave energy. In these embodiments, no lamination layer is necessary.

The unusually high COF of the walking surface in wet conditions is achieved by a combination of oriented, stiff, laminated mesh strands having high tensile and shear strengths, and a unique high COF polymer-coated nodular surface on the mesh material. Water and dust covering the underlayment surface predominantly reside in the spaces between nodes and strands, and not on the nodes. As water and dust accumulate, they will flow over the strands and reside in the spacing pockets between the strands without covering the nodes.

A roofing installer walking on the noded mesh surface will transmit the walking load primarily onto the nodes, which are generally free of water and dust. The high strength, oriented nodes have very high normal and shear force resistance in all directions, therefore a high COF results under various walking scenarios of pitch, angle and load.

While the mesh layer nodes possess a high COF even in dry conditions, a polymer surface coating such as EVA copolymer may be applied to the mesh to increase the COF. An example of such a coated mesh is Thermanet™, produced by Conwed Plastics™ of Minneapolis. The mesh layer may be coated on both sides with EVA, which will reduce the incidence of delamination of the mesh layer from the structural layer.

The mesh design (nodes/unit area), mesh polymer type, and node shape, size and weight may be selected to optimize foot traction and coating layer securement. If the node density is too high, the surface may become effectively smooth, and: may not provide slip resistance. If the node density is too low, the mesh may not provide sufficient traction under wet characteristics.

The structural layer may comprise woven tapes of polyolefin such as polyethylene or polypropylene, or woven reinforced membrane substrates such as polyethylene terephthalate, nylon or glass. Alternatively, the structural layer may comprise non-woven polyolefins such as spun bond polyolefin, or non-woven reinforced membrane substrates such as polyethylene terephthalate, nylon or glass. Other materials are also possible.

The use of a nodular mesh material provides the benefits of hard, rigid inorganic particles under wet conditions, but is more compatible with polymer underlayment manufacturing processes than is addition of inorganic particle coatings. The strands and nodes together provide a traction mechanism, with the strands providing reinforcement to the nodes. The use of nodes without strands would be undesirable as such stand alone nodes would be vulnerable to shearing off unless extremely high adhesion forces were present.

Figure 3:
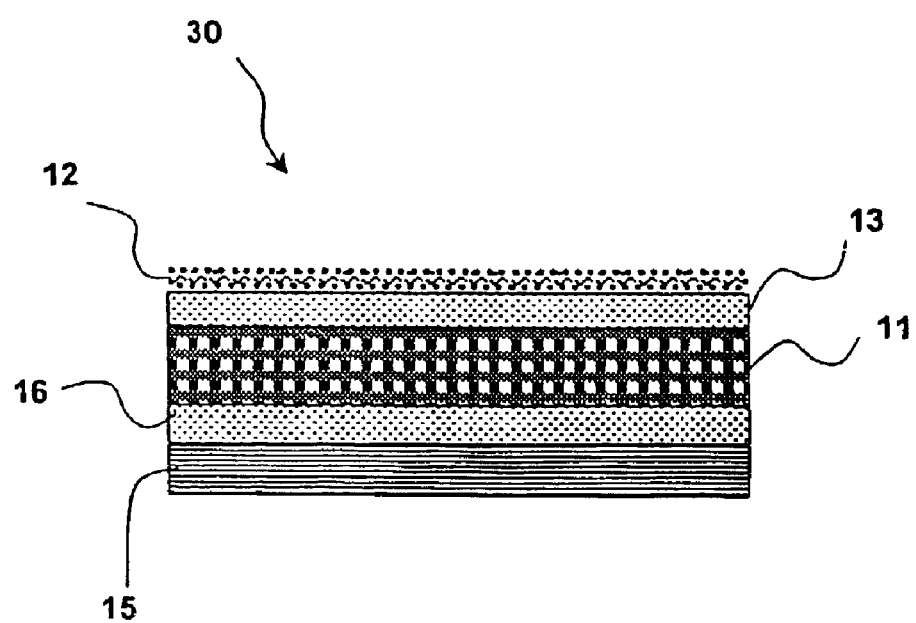
FIG. 3 is a cross-sectional view of a second embodiment of a roofing underlayment showing a structural layer laminated to slip-resistant film.

Referring to FIG. 3, roofing underlayment 30 has a mesh layer 12 laminated to the upper surface of a structural layer 11. A high COF film 15 is laminated by a first lamination layer 16 to the lower surface of the structural layer. The high COF film may comprise EVA. The mesh layer is laminated to the structural layer by a second lamination layer 13.

As wet conditions generally are not found on the deck side of the underlayment, it is not necessary to laminate the mesh layer to the bottom surface of the underlayment. Sufficient COF between the underlayment and the deck may be achieved by application of tacky coatings such as EVA to the lower surface of the underlayment. It is advantageous to provide a high COF between underlayment bottom and the deck surface, as applicators are likely to walk over the underlayment before it is secured. Any slippage between underlayment and deck may cause accidents. The use of coatings such as EVA, increases the COF between the deck and the bottom of the underlayment to render the underlayment secure until the underlayment is fully secured by roofing nails or staples.

One or more of the layers of the sheet material may be lightly coloured to provide reflection of solar radiation. This provides the sheet material with less heat absorption, which results in a cooler roof, lower attic temperatures, and a cooler working surface for applicators. The sheet material is lightweight for faster installation and lower volume to inventory and handle.

In one particular embodiment, the invention is a synthetic roofing underlayment comprising of a woven tape structural layer of polyethylene or polypropylene, extrusion coated with low-density polypropylene on the top surface, and a thermoplastic noded mesh material coated on both sides by EVA (such as Conwed. Plastics Thermanet™ 750012-018) simultaneously laminated onto the top surface of the structural layer. The oriented strands are typically approximately 0.15 mm (0.006 inches) in thickness, whereas the node junctions are approximately 0.5 mm (0.02 inches) in thickness, thus providing a nodular characteristic for enhanced shear load bearing. The bottom surface of the underlayment is coated with EVA by direct extrusion, or lamination of an EVA film by thermal bonding or coating. EVA grades are preferably 5–20% EVA comonomer, such as Dupont Elvax™ or similar resins imparting a static or dynamic COF near 1.0. The woven structural layer provides high strength and light weight for ease of application, and resistance to tearing and wind blow off. The underlayment is free of buckling and wrinkling characteristic common in organic asphalt felts.

The structural layer, lamination layer, coatings, and mesh layer may be treated with UV stabilizers to provide for exposure resistance during applications where the underlayment has been installed to dry-in the roof, but application of the primary roofing material is delayed. This scenario is very common in tile and metal roofing applications. One or more layers may be treated with a mold inhibitor or fire retardant additive.

The noded surface of the present invention enables its use in a variety of applications where safe walkability in extreme conditions or on pitched surfaces is required.

Further, the inner surface of this product can be treated with adhesives backed by a release liner that protects the adhesive and prevents the product from sticking to itself. During application, the release liner is easily removed to aid in positioning of sheets and to maintain proper line, allowing the product to stick to the installation surface and eliminating the need for mechanical fasteners which puncture the underlayment, thereby generating opportunities for water penetration.

Figure 4:
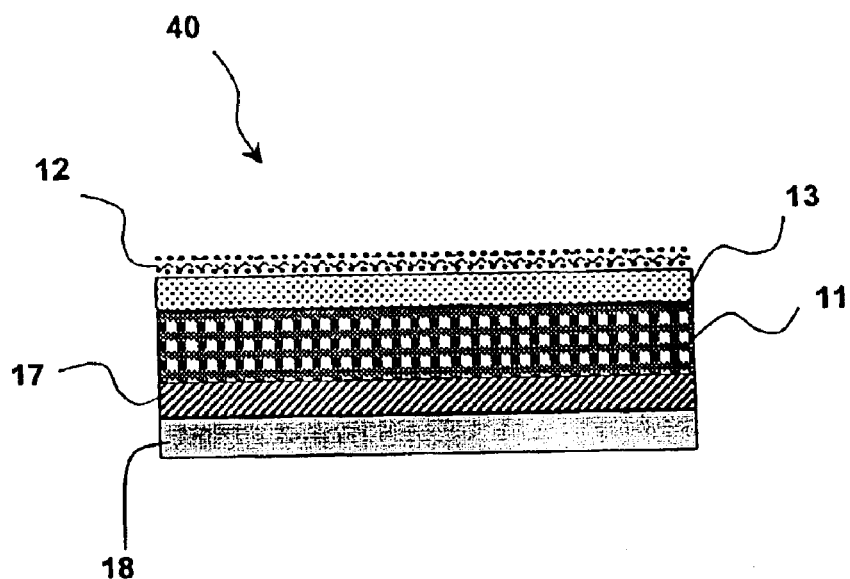
FIG. 4 is a cross-sectional view of a third embodiment of a roofing underlayment showing a peel-and-stick treatment.

Referring to FIG. 4, in roofing underlayment 40, a mesh layer 12 is laminated by a synthetic lamination layer 13 to the top surface of the structural layer 11. The bottom surface of the structural layer 11 is coated with a thin adhesive layer 17 which is laminated to a removable release liner 18.

An alternative embodiment provides a mesh layer laminated to molten rubberized asphalt to produce a self-adhering underlayment exhibiting good walkability under wet conditions. Typically, a polymer such as Kraton™ (Shell Chemicals) rubber is emulsified within an asphalt matrix to produce a highly elastic core sealing membrane layer which is laminated to an outer film surface, and the bottom surface is coated with an adhesive to which is laminated, to a release liner.

Figure 5:
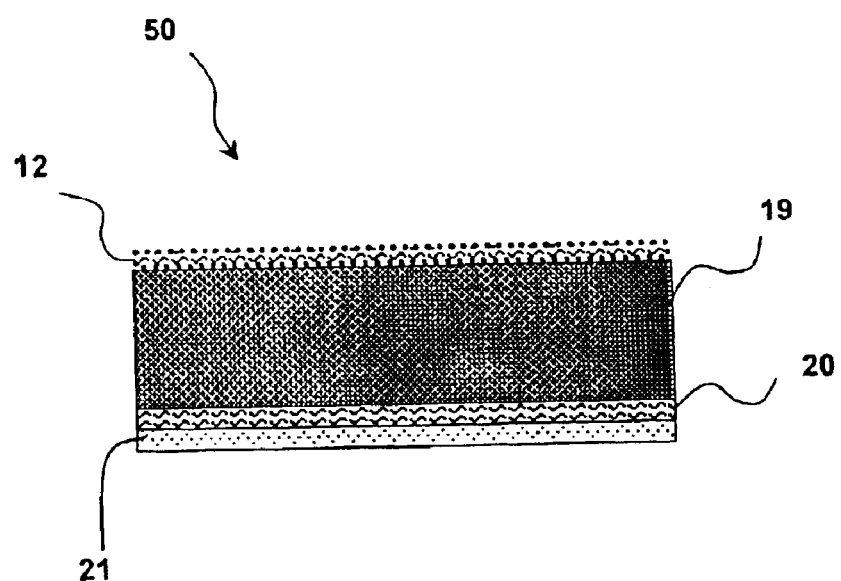
FIG. 5 is a cross-sectional view of a fourth embodiment of a roofing underlayment showing a self-adhered bituminous rubberized asphalt layer.

Referring to FIG. 5, in underlayment 50 a mesh layer 12 is laminated to the upper surface of a bituminous rubberized asphalt layer 19 1.6 to 2.4 mm (0.040 to 0.060 inches) thick. The lower surface of the asphalt layer is coated with a thin layer of adhesive 20, which is laminated to a removable release liner 21. Underlayments having an adhesive layer and release paper are commonly known as "peel and stick" underlayments.

The roofing underlayment of the present invention has high tensile and tear strengths, exhibits a high COF in dry, wet or dusty conditions, and is lightweight, permitting fast installation and reducing the number of rolls of underlayment to inventory and handle.

The synthetic polymer construction of the present invention is free from wrinkling and buckling caused by water absorption. Such water effects are common with asphalt felts, and can interfere with primary roof covering installation.

The sheet material of the present invention has been evaluated as a roofing underlayment and passed by an external lab in accordance with International Conference of Building Officials Evaluation Services ("ICBO-ES") Acceptance Criteria for AC 188 & AC 48 (including Section 4.7—Accelerated Aging, and Section 4.8—Ultraviolet Exposure), ASTM D226 (pliability), ASTM D1970 (tensile testing and nail sealability penetration), and ASTM D4869 (liquid water transmission).

Several field application tests were conducted with various roofing underlayment samples attached to solid decking roofing substrates to simulate dry and wet conditions under various roof pitches. The results of these tests demonstrated the vastly superior walkability properties of the mesh-surfaced product of the present invention over the above mentioned "smooth" underlayments.

For example, in one test the mesh-surfaced invention comprising a woven polyethylene structural layer with an EVA film laminated to the bottom surface and a ConWed™ 2-sided EVA Thermanet™ mesh layer laminated to the top walking surface was attached to a roof pitch of 8:12. Alongside this material was attached the same structural layer having merely a smooth EVA film walking surface.

Water was poured from above equally onto both materials to provide a wet surface simulation. Subsequently, various roofing professionals with various shoe types, and with proper safety precautions, proceeded to attempt to walk upwards on these wet surfaces. Only on the mesh covered woven underlayment sample was it possible to walk repeatedly up and down the pitch under wet conditions. For the smooth surfaced sample, immediate slippage resulted.

In an attempt to provide a more scientifically-based and standardized measurement of walkability, the COF of the invention and various other roofing underlayments was tested utilizing a customized COF test method that simulates roof walking physics.

During the tests, the COF of the roof underlayment of the invention was tested relative to three competing underlayments: 30# felt, Triflex 30™ and RoofTopGuard II™, using an NBS-Sigler™ Pendulum Impact Tester according to Federal Test Standards NBS7121 and NBS501. The underlayments were tested under dry and wet conditions on a flat surface, a pitch of 18.4 degrees, and a pitch of 45 degrees.

Result of COF tests performed on the mesh surface sheet material against products that have common application is provided in Tables 2 and 3 below.

TABLE 2

Comparative improvement in COF under dry conditions

| Test Condition | COF Improvement Mesh Surface vs. 30# felt | COF Improvement Mesh Surface vs. Triflex 30 ™ | COF Improvement Mesh Surface vs. RoofTopGuard II ™ |
|---|---|---|---|
| COF dry Flat | 16% | 8% | 14% |
| COF dry 4/12 pitch | 17% | 9% | 15% |
| COF dry 12/12 pitch | 15% | 10% | 21% |

TABLE 3

Comparative improvement in COF under wet conditions

| Test Condition | COF Improvement Mesh Surface vs. 30# felt | COF Improvement Mesh Surface vs. Triflex 30 ™ | COF Improvement Mesh Surface vs. RoofTopGuard II ™ |
|---|---|---|---|
| COF wet Flat | 24% | 44% | 18% |
| COF wet 4/12 pitch | 23% | 43% | 16% |
| COF wet 12/12 pitch | 23% | 39% | 14% |

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

It will be readily appreciated by those skilled in the art that various modifications of the present invention may be devised without departing from the essential concept of the invention, and all such modifications are intended to be included in the scope of the claims appended hereto.

What is claimed is:

1. A sheet material comprising:
    a flexible structural layer; and
    a mesh layer laminated to the structural layer, the mesh layer having interconnecting strands and nodes protruding from the upper surface of the mesh layer at the junctions of the strands.

2. The sheet material of claim 1 further comprising a lamination layer laminated between the structural layer and the mesh layer.

3. The sheet material of claim 2 wherein the lamination layer comprises a polyolefin.

4. The sheet material of claim 3 wherein the polyolefin comprises low-density polyethylene.

5. The sheet material of claim 3 wherein the polyolefin comprises polypropylene.

6. The sheet material of claim 2 wherein the lamination layer comprises a blend of polyolefins.

7. The sheet material of claim 2 wherein the lamination layer comprises a polymer having a high COF.

8. The sheet material of claim 2 wherein one or more of the layers is treated with ultraviolet stabilizers.

9. The sheet material of claim 2 wherein one or more of the layers is lightly coloured.

10. The sheet material of claim 2 wherein one or more of the layers is treated with a mold inhibitor.

11. The sheet material of claim 2 wherein one or more of the layers is treated with a fire retardant additive.

12. The sheet material of claim 1 wherein the mesh layer is treated with a tacky coating.

13. The sheet material of claim 12 wherein the tacky coating comprises ethylene vinyl acetate copolymer.

14. The sheet material of claim 1 wherein the structural layer comprises woven polyolefin tapes.

15. The sheet material of claim 1 wherein the structural layer comprises a non-woven polyolefin.

16. The sheet material of claim 15 wherein the non-woven polyolefin comprises a spun bond polyolefin.

17. The sheet material of claim 1 wherein the structural layer comprises a woven reinforced membrane substrate.

18. The sheet material claim 17 wherein the substrate is selected from the group consisting of polyethylene terephthalate, nylon and glass.

19. The sheet material of claim 1 wherein the structural layer comprises a non-woven reinforced membrane substrate.

20. The sheet material of claim 19 wherein the substrate is selected from the group consisting of polyethylene terephthalate, nylon and glass.

21. The sheet material of claim 1 for use as an underlayment.

22. The sheet material of claim 1 for use as an industrial wrapping material.

23. The sheet material of claim 1 for use as a fabric.

24. The sheet material of claim 1 further comprising a high COF coating on the lower surface of the structural layer.

25. A roof underlayment, comprising:
- a mesh layer having interconnected strands and nodes protruding from the upper surface of the mesh layer at the junctions of the strands;
- a flexible structural layer laminated to the mesh layer; and
- a high COF film laminated to the lower surface of the structural layer.

26. The roof underlayment of claim 25 further comprising a first lamination layer laminated between the mesh layer and the structural layer and a second lamination layer laminated between the structural layer and the high COF film.

27. The roof underlayment of claim 26 wherein the first or second lamination layer comprises a polyolefin.

28. The roof underlayment of claim 27 wherein the polyolefin comprises low-density polyethylene.

29. The roof underlayment of claim 28 wherein the polyolefin comprises polypropylene.

30. The roof underlayment of claim 26 wherein the first or second lamination layer comprises a blend of polyolefins.

31. The roof underlayment of claim 26 wherein the first or second lamination layer comprises a tacky polymer.

32. The roof underlayment of claim 26 wherein one or more of the layers is treated with ultraviolet stabilizers.

33. The roof underlayment of claim 26 wherein one or more of the layers is lightly coloured.

34. The roof underlayment of claim 26 wherein one or more of the layers is treated with a mold inhibitor.

35. The roof underlayment of claim 26 wherein one or more of the layers is treated with a fire retardant additive.

36. The roof underlayment of claim 25 wherein the mesh layer is treated with a tacky coating.

37. The roof underlayment of claim 36 wherein the tacky coating comprises ethylene vinyl acetate copolymer.

38. The roof underlayment of claim 25 wherein the structural layer comprises woven polyolefin tapes.

39. The roof underlayment of claim 25 wherein the structural layer comprises a non-woven polyolefin.

40. The roof underlayment of claim 39 wherein the non-woven polyolefin comprises a spun bond polyolefin.

41. The roof underlayment of claim 25 wherein the structural layer comprises a woven reinforced membrane substrate.

42. The roof underlayment of claim 41 wherein the substrate is selected from the group consisting of polyethylene terephthalate, nylon and glass.

43. The roof underlayment of claim 25 wherein the structural layer comprises a non-woven reinforced membrane substrate.

44. The roof underlayment of claim 43 wherein the substrate is selected from the group consisting of polyethylene terephthalate, nylon and glass.

45. The roof underlayment of claim 25 wherein the film comprises ethyl vinyl acetate copolymer.

46. A roof underlayment, comprising:
- a mesh layer having interconnected strands and nodes protruding from the upper surface of the mesh layer at the junctions of the strands;
- a bituminous rubberized asphalt layer laminated to the lower surface of the mesh layer;
- an adhesive layer laminated to the lower surface of the asphalt layer; and
- a release liner releasably laminated to the lower surface of the adhesive layer.

* * * * *